March 11, 1941.    J. A. ANGLADA    2,234,718
ZERO LASH DEVICE
Filed July 9, 1938
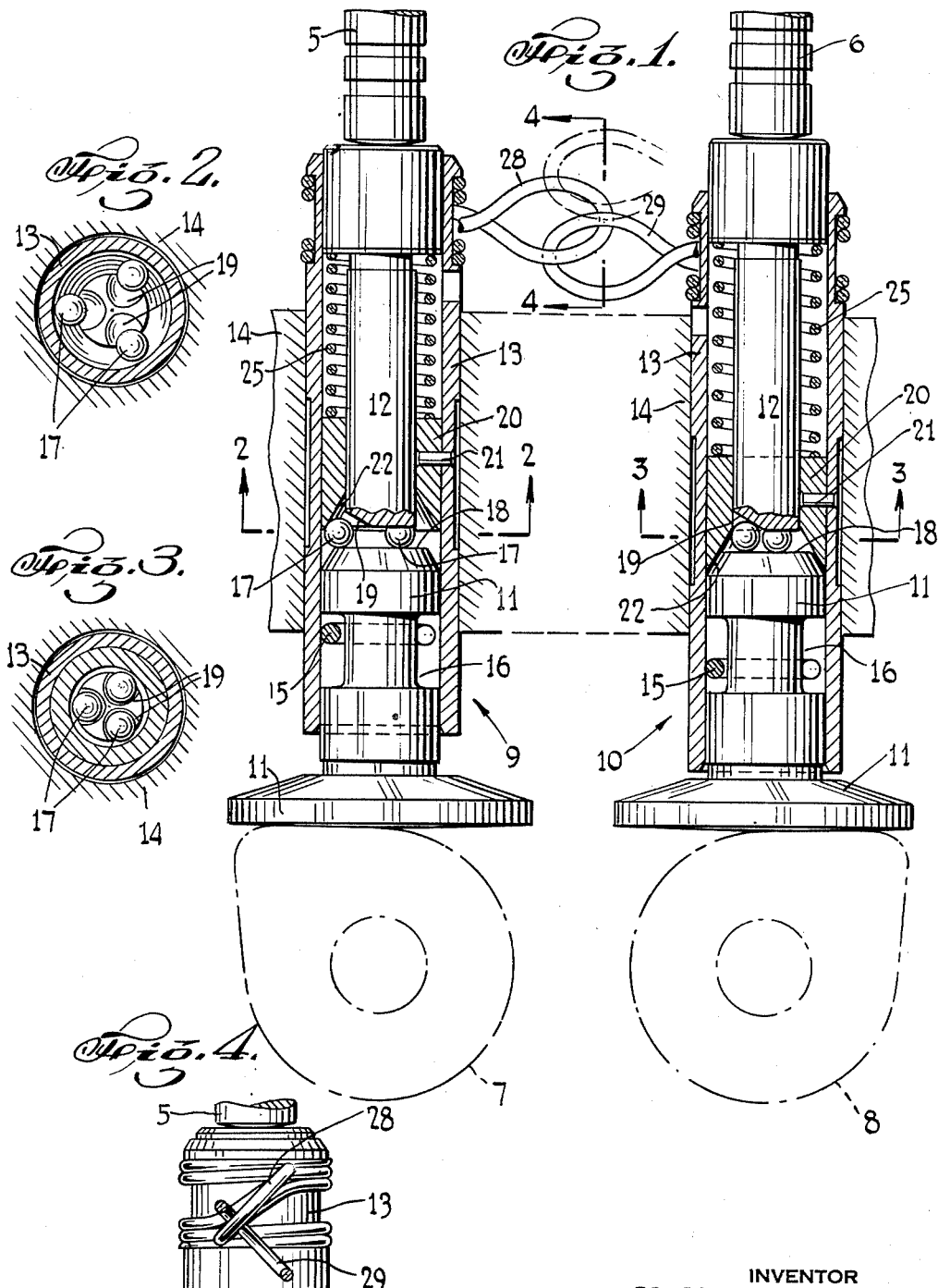
INVENTOR
JOSEPH A. ANGLADA
BY
Hammond & Littell
ATTORNEYS Patented Mar. 11, 1941

2,234,718

UNITED STATES PATENT OFFICE 2,234,718

ZERO LASH DEVICE

Joseph A. Anglada, New York, N. Y.

Application July 9, 1938, Serial No. 218,350

26 Claims. (Cl. 123—90)

The present invention relates to zero lash devices for transmitting motion between operating parts.

The invention has been developed more particularly in the production of valve tappets to transmit motion from the cam shaft to the valves of an internal combustion engine and for the purposes of disclosing the principles of the invention such an embodiment will be described. It is to be understood, however, that the particular description is illustrative merely and the inventive principles may be applied to various other lost motion take-up devices.

Under normal conditions of operation of an internal combustion engine, variations in the distance between the cam shaft and the valve stems occur causing lost motion and noise or inaccurate control of the valves. It is, therefore, desirable to provide a valve tappet having provision for automatic compensation for this difference in distance.

The present invention has for an object to provide an improved device of general application for transmitting motion from one part to another, in which provision is made for compensating for lost motion.

Another object is to provide an improved motion transmitting device having relatively adjustable parts which are automatically adjusted in use to effectively prevent lost motion.

Another object is to provide a motion transmitting device having automatically relatively adjustable members and improved means for locking said members in relatively adjusted position.

Another object is to provide an automatic lost motion take-up arrangement wherein adjustment occurs while the adjustable parts are relatively in a state of rest and the distance between the actuating and actuated members is fixed.

A further object is to provide an effective automatic lost motion take-up device especially adapted for use between the valves and cam shaft of an internal combustion engine of a design such that it can be expeditiously and economically manufactured.

The invention provides in its broader aspects a motion transmitting device having parts which are relatively adjustable to provide zero lash between an actuating member and an actuated member, and a lock for holding said members in relatively adjusted position, together with means for periodically releasing said lock to permit readjustment of the parts to compensate for any difference in the distance between the actuating and the actuated elements which may have developed.

The nature and objects of the invention will be better understood from a description of a particular illustrative embodiment thereof for the purposes of which description reference should be had to the accompanying drawing forming a part hereof and in which—

Figure 1 is a view partly in elevation and partly in section of two similar valve tappets, one in valve lifting position with its parts locked in relatively adjusted relation and the other in idle position with its locking means released, and Figs. 2, 3 and 4 are detail views.

In the embodiment shown for the purposes of illustration two similar valves, the stems of which are indicated at 5 and 6 are operated from two similar cams 7 and 8 by means of valve tappets 9 and 10. The two valve tappets are of similar construction. In each the foot member 11 engaging the cam and the plunger 12 engaging the valve stem are relatively longitudinally adjustable to take up lost motion and provide a zero lash motion transmitting device. Both the foot member and the plunger are retained in relative position and are capable of longitudinal movement in the sleeve 13 which in turn is movable in the fixed supporting guide 14. The foot member 11 is sufficiently retained in position in the sleeve 13 when the tappet is not in place in the engine by an expanding spring ring 15 which bears firmly against the sleeve and is received in an annular recess 16 in the foot member 11. The recess is of a length to permit all desirable relative movement of the foot member and sleeve.

The opposing faces, that is to say the upper end of the foot member 11 and the lower end of the plunger 12, are formed to provide surfaces at an angle and means such as balls 17 to hold the two elements in separated adjusted position.

In the particular structure shown the opposed relatively inclined surfaces between the foot member 11 and the plunger 12 are provided by the flat upper end 18 of the foot member and three radial inclined grooves 19 in the lower end of the plunger. An adjusting-locking sleeve cam 20 is carried by the sleeve 13 and in operation is movable downward to hold the balls in adjusted locking position. The cam sleeve is a driving fit in the operating sleeve 13 or may be integral with the sleeve. A pin 21 is shown conventionally as securing the sleeves together. The cam sleeve is provided with a tapered inner face 22 at its lower end thus providing in effect a wedge to hold each ball in its position of adjustment. Between the head of the plunger 12 and the cam sleeve a compression coil spring 25 is provided to serve two purposes; first, to move the relatively longitudinally movable foot member 11 and plunger 12 apart to take up any lost motion between the cam and the valve stem and, second, to move the cam sleeve down and to hold it in its lower position, thereby holding the wedging balls in adjusted positions in their grooves. The cam actuating spring 25 is substantially less strong than the valve seating spring and, therefore, it will not lift the valve from its seat. When in the operation of the device relative movement of the foot member 11 and plunger 12 are permitted to occur these parts will take their position against the cam and valve stem, respectively, and when the cam sleeve moves downward it will press the ball members radially inward in their respective grooves until the plunger is locked thereby against movement toward the foot member 11. Upon rotation of the cam the tappet will operate as a member of invariable length positively to lift the valve stem.

The relative angles of the parts engaged by the balls 17 are so chosen that in operation the tappet will operate positively to lift the valve stem without a slipping of the wedging balls outward under the pressure applied by the cam. On the other hand, the angles are such that under the pressure of the cam actuating spring 25 the balls will not be forced inward to apply excessive lift on the plunger 12. In other words, the angles are so selected that the arrangement will serve as a lock to hold the parts in adjusted position without causing a relative movement of the parts to change the adjustment such as would defeat the purposes of the arrangement.

In the particular construction illustrated the effective angle of the ball engaging grooves 19 in the end of the plunger 12 is 30° to the horizontal plane surface 18 of the top of the foot member 11. The conical surface 22 of the ball operating cam sleeve is 30° to the axis of the sleeve. These angles are not critical and as a matter of fact should be correlated to the tension of the cam operating spring 25, friction, inertia of parts and nature of the service in which the invention is used.

During operation of the engine the sleeve 13 is periodically lifted, thereby withdrawing the holding cam sleeve 20 and releasing the locking balls to permit them to move radially outward. The foot member 11 and plunger 12 are then free to move toward as well as from each other. If the distance between the cam 6 and the valve stem 5 has been reduced, the plunger will be forced downward, thereby shortening the effective length of the tappet to compensate for the change of condition. If, on the other hand, the distance is greater, the plunger will be moved upward by the compression spring 25 into contact with the valve stem. In either event, when the outer sleeve and the sleeve cam are permitted to move downward under action of the compression spring 25, the locking balls will be moved inward to locking position. As above stated the compression spring 25 is substantially weaker than the valve seating spring, whereby the operation of the compression spring and the locking members will not over compensate and raise the valve from its seat.

The timing of the operation is such that the locking members or balls 17 are released by the lifting of the cam sleeve 20 only when the engine cam is in its relative inoperative position with the valve and tappet at rest in lowermost position. By this timing of the release useless relative movement of the foot member 11 and plunger 12 is avoided.

Any suitable means may be provided for lifting the outer sleeve 13 and holding cam 20. In the structure illustrated, the two similar tappets are so connected that the lifting of one tappet by its cam to operate the corresponding valve will lift the sleeve of the companion tappet thereby releasing its holding cam. The arrangement for accomplishing this is shown as comprising interengaging wire loops 28 and 29. Each loop is formed of relatively heavy spring steel wire, firmly secured around the corresponding tappet sleeve and projecting to provide the operative loop. The position of the disengaging loop 29 relative to the coacting loop 28 when the loop 29 has raised the loop 28 to uppermost unlocking position is shown in dot and dash lines. The loops 28 and 29 are so shaped that during operation wherein they act alternately each to lift the other a slight oscillatory movement is imparted to both sleeves 13. This movement causes distribution of the lubricating oil and to some extent distribution of wear.

The foregoing particular description of one simple embodiment of the invention is illustrative merely and is not intended as defining the limits of the invention. Obviously the inventive principles may be variously applied within the scope of the appended claims.

I claim:

1. In a valve operating mechanism the combination with a valve stem and an operating cam of an automatically compensating tappet therebetween comprising longitudinally relatively movable members having opposed surfaces transverse to the line of movement of said members, an adjustable spacing element between said surfaces, a cam member normally holding said spacing element in adjusted position and means for momentarily retracting said cam element while the tappet is at rest and the valve closed.

2. In a valve operating mechanism the combination with two valve stems and an operating cam, of automatically compensating tappets for lifting said valve stems each comprising longitudinally relatively movable members and means for holding said members in longitudinally adjusted relation together with means operated upon movement of each tappet to release said holding means of the other tappet.

3. In a valve operating mechanism the combination with two valve stems and an operating cam of automatically compensating tappets for lifting said valve stems each comprising a sleeve, opposed plungers movable longitudinally within said sleeve, holding means cooperating with said sleeve for holding said plungers in adjusted spaced relation and releasable upon movement of said sleeve together with connections between said sleeves whereby operative movement of one tappet to lift its valve stem moves the other sleeve to release its holding means.

4. In a valve operating mechanism, the combination with a valve stem and an operating cam, of an automatically compensating tappet therebetween, said tappet comprising a sleeve, opposed plungers in said sleeve, a wedging element movable transversely between said plungers to hold the same in separated adjusted position, a cam for moving said wedging element into holding position carried by said sleeve, a spring tending to move said cam in a direction to move the wedging element into holding position and to separate said plungers, and positively acting means operating intermittently to move said sleeve to release said cam.

5. In a valve operating mechanism, the combination with a valve stem and an operating cam, of an automatically compensating tappet therebetween comprising a reciprocable sleeve, opposed plungers movable longitudinally in said sleeve, a wedging member between said opposed plungers operable to hold said plungers in adjusted spaced relation, a cam operative to move said wedging member into wedging position and connected to be retracted by said sleeve, a spring tending to move the cam to press the wedging member into wedging position and positively actuated means for moving the sleeve intermittently to withdraw the cam and release the wedging member during a period of rest of said tappet.

6. In a valve operating mechanism, the combination with a valve stem and an operating cam, of an automatically compensating tappet therebetween comprising a reciprocable sleeve, opposed plungers movable longitudinally in said sleeve, a wedging member between said opposed plungers operable to hold said plungers in adjusted spaced relation, a cam operative to move said wedging member into wedging position, a spring tending to move the cam to press the wedging member into wedging position and positively actuated means for retracting the cam to release the wedging member during a period of rest of said tappet.

7. In a valve operating mechanism, the combination with a valve stem and an operating cam, of an automatically compensating tappet therebetween comprising a vertically movable sleeve, upper and lower opposed plungers movable longitudinally in said sleeve, a wedging member between said opposed plungers movable transversely within the sleeve to hold said plungers in adjusted spaced relation, a cam carried by said sleeve presenting a beveled face toward said wedging member, a spring surrounding the upper plunger within said sleeve tending to move the plunger upward and the sleeve downward, thereby pressing the wedging member into wedging position to hold said plungers in adjusted spaced relation, and positively actuated means for lifting the sleeve intermittently to release the wedging member during a period of rest of said tappet.

8. In a valve operating mechanism, the combination with a pair of valve stems and operating cams therefor, of a pair of automatically compensating tappets therebetween, each tappet comprising a reciprocably mounted sleeve, opposed plungers movable longitudinally within said sleeve, a wedging member between said opposed plungers operable to hold said plungers in adjusted spaced relation, a cam operative to move said wedging member into wedging position, a spring tending to move the cam to press the wedging member into wedging position, and a lost motion connection between the tappets operative upon movement of either tappet to move the cam of the other tappet to position to release the wedging member.

9. A valve operating unit comprising a pair of compensating tappets adapted to be inserted in a gas engine between two valve stems and two operating cams, each tappet comprising a sleeve, opposed plungers movable longitudinally in said sleeve, a wedging member between said plungers to hold said plungers in adjusted spaced relation, a cam carried by said sleeve operating to press the wedging member into holding position, a spring surrounding one plunger tending to move the cam to operate said wedging member to hold said plungers in adjusted position and tending to separate said plungers, together with a lost motion connection between the sleeves operative upon valve actuating movement of a tappet to move the sleeve of the other tappet to a lesser distance to release the cam.

10. In a valve operating mechanism, the combination with a valve stem and an operating cam, of an automatically compensating tappet therebetween comprising a sleeve, opposed plungers movable longitudinally in said sleeve, a wedging member between said plungers to hold said plungers in adjusted spaced relation, a cam carried by said sleeve operating to press the wedging member into holding position, a spring surrounding one plunger tending to move the cam to operate said wedging member to hold said plungers in adjusted position and tending to separate said plungers, and means for intermittently moving the sleeve to move the cam and release the wedge while the tappet is at rest with the valve closed.

11. A valve operating unit comprising a pair of compensating tappets adapted to be inserted in a gas engine between two valve stems and two operating cams, each tappet comprising a sleeve, opposed plungers movable longitudinally in said sleeve, a wedging member between said plungers to hold said plungers in adjusted spaced relation, a cam carried by said sleeve operating to press the wedging member into holding position, a spring surrounding one plunger tending to move the cam to operate said wedging member to hold said plungers in adjusted position and tending to separate said plungers, and means for intermittently moving the sleeve to move the cam and release the wedge while the tappet is at rest with the valve closed.

12. A valve operating unit comprising a pair of compensating tappets adapted to be inserted in a gas engine between two valve stems and two operating cams, each tappet comprising a sleeve, opposed plungers movable longitudinally in said sleeve, a wedging member between said plungers to hold said plungers in adjusted spaced relation, a cam carried by said sleeve operating to press the wedging member into holding position, a spring surrounding one plunger tending to move the cam to operate said wedging member to hold said plungers in adjusted position and tending to separate said plungers, together with a lost motion connection between each cam and the other tappet whereby operative valve lifting movement of either tappet will release the cam of the other tappet.

13. In a valve operating mechanism, the combination with a pair of valve stems and operating cams therefor, of a pair of automatically compensating tappets therebetween, each tappet comprising a reciprocably mounted sleeve, opposed plungers movable longitudinally within said sleeve, a wedging member between said plungers movable transversely of the sleeve to hold said plungers in adjusted spaced relation, a cam member carried by said sleeve and presenting a beveled face toward said wedging member, a spring pressing said cam member against said wedging member to press the latter into wedging position, a connection between the cam of each tappet and the other tappet whereby operative movement of one tappet will cause movement of the cam of the other tappet to position to release the wedging member.

14. In a valve operating mechanism, the combination with a pair of valve stems and operating cams therefor, of a pair of automatically compensating tappets therebetween, each tappet comprising a reciprocably mounted sleeve, opposed plungers movable longitudinally within said sleeve, a wedging member between said plungers movable transversely of the sleeve to hold said plungers in adjusted spaced relation, a cam member carried by said sleeve and presenting a beveled face toward said wedging member, a spring pressing said cam member against said wedging member to press the latter into wedging position, a lost motion connection between the respective cams whereby operative movement of either tappet will release the cam of the other tappet.

15. An automatically compensating motion transmitting device comprising, in combination, telescoping members two of which have opposed transverse faces, a wedge member movable transversely between said opposed faces, a cam for holding said wedge in adjusted position and means for retracting said cam while the motion transmitting device is at rest.

16. In a valve operating mechanism the combination with a valve stem and an operating cam of an automatically compensating tappet therebetween comprising adjustable telescoping members, a wedging member movable transversely with respect to two of said members to hold the same in adjusted position, a cam movable relative to and normally holding said wedging member in adjusted position and means for momentarily retracting said cam while the tappet is at rest and the valve closed.

17. In a valve operating mechanism, the combination with a valve stem and an operating cam of an automatically compensating tappet therebetween comprising opposed longitudinally adjustable members including a sleeve holding the other members together, two of said members having opposed surfaces transverse to the line of movement, an adjustable spacing member between said opposed surfaces, a cam movable longitudinally with reference to the adjustable member and normally holding said spacing member in adjusted position and means for momentarily retracting said cam by movement longitudinally of the adjustable members while the tappet is at rest and the valve closed.

18. In a valve operating mechanism, the combination with a valve stem and an operating cam, of an automatically compensating tappet therebetween comprising a sleeve, opposed plungers relatively adjustable longitudinally toward and from each other in said sleeve, a wedging member between said opposed plungers movable transversely within said sleeve to hold the plungers in adjusted relation and means acting positively to release said wedging member and permit readjustment of the plungers after one lifting operation of said tappet and before the next lifting operation.

19. In a valve operating mechanism, the combination with a pair of valve stems and operating cams therefor of a pair of automatically compensating tappets therebetween, each tappet comprising opposed members movable toward and from each other and positively acting releasable means for holding said members in adjusted relation, together with a cross connection between the tappets arranged to be actuated when one tappet is actuated and in turn to release the holding means of the other tappet.

20. In a valve operating mechanism, the combination with a pair of valve stems and operating cams therefor of a pair of automatically compensating tappets therebetween, each tappet comprising opposed members movable toward and from each other and positively acting releasable means for holding said members in adjusted relation, together with a cross connection adapted to be actuated with either tappet and operable when so actuated to release the holding means of the other tappet.

21. In a valve operating mechanism, the combination with a pair of valve stems and operating cams therefor of a pair of automatically compensating tappets therebetween, each tappet comprising opposed members movable longitudinally toward and from each other, positively acting means to hold said opposed members in adjusted relation, together with a connection between the tappets operative upon valve lifting movement of either tappet to release the holding means of the other tappet.

22. A valve operating unit comprising a pair of compensating tappets adapted to be inserted in a gas engine between two valve stems and two operating cams, each tappet comprising longitudinally movable opposed members, a wedging member between said members to hold them in adjusted spaced relation, means operating to press the wedging member into holding position, and a connection between the pressing means of the two tappets operative upon valve actuating movement of one tappet to release the pressing means of the other tappet.

23. A valve operating unit comprising a pair of compensating tappets adapted to be inserted in a gas engine between two valve stems and two operating cams, each tappet comprising longitudinally movable opposed members, a holding member holding said members in adjusted spaced relation, a positively acting locking means operating to hold the holding member in operative position and a lost motion connection between the two tappets coacting with the locking means and operative upon valve actuating movement of one tappet to release the holding means of the other tappet.

24. In a valve operating mechanism, the combination with a valve stem and an operating cam, of an automatically compensating tappet therebetween comprising a sleeve, opposed plungers relatively adjustable longitudinally toward and from each other in said sleeve, a wedging member between said opposed plungers movable transversely within said sleeve to hold the plungers in adjusted relation and means acting to release said wedging member and permit readjustment of the plungers while the tappet is at rest and the valve closed.

25. An automatically compensating motion transmitting device comprising, in combination, longitudinally movable motion transmitting members havng opposed transverse faces, a wedge member adjustable transversely between said opposed faces to hold the motion transmitting members in adjusted relation, a cam for holding said wedge member in adjusted position but retractable longitudinally of the motion transmitting members to release the wedge member and means for retracting said cam while the motion transmitting device is at rest.

26. An automatically compensating motion transmitting device comprising, in combination, longitudinal motion transmtting members having opposed transverse faces, a wedge member adjustable transversely between said opposed faces to hold the motion transmitting members in adjusted relation, a cam movable longitudinally of the motion transmitting members for holding said wedge member in adjusted position, and means for intermittently retracting said cam by movement longitudinally of the motion transmitting members to release the wedge member.

JOSEPH A. ANGLADA.